(12) United States Patent
Ivanov

(10) Patent No.: US 10,931,697 B2
(45) Date of Patent: Feb. 23, 2021

(54) SYSTEM AND METHOD OF IDENTIFYING FRAUDULENT ACTIVITY FROM A USER DEVICE USING A CHAIN OF DEVICE FINGERPRINTS

(71) Applicant: AO Kaspersky Lab, Moscow (RU)

(72) Inventor: Sergey N. Ivanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 188 days.

(21) Appl. No.: 16/407,270

(22) Filed: May 9, 2019

(65) Prior Publication Data
US 2020/0213339 A1 Jul. 2, 2020

(30) Foreign Application Priority Data
Dec. 28, 2018 (RU) .......................... RU2018147222

(51) Int. Cl.
*H04L 29/06* (2006.01)
(52) U.S. Cl.
CPC ...... *H04L 63/1425* (2013.01); *H04L 63/0876* (2013.01)
(58) Field of Classification Search
CPC ............ H04L 63/1425; H04L 63/0876; H04L 63/108; H04L 2463/146; G06F 21/44
USPC .......................................................... 726/23
See application file for complete search history.

(56) References Cited

U.S. PATENT DOCUMENTS

| | | | | |
|---|---|---|---|---|
| 2011/0153417 A1* | 6/2011 | Bernosky | ........... | G06Q 30/0251 705/14.49 |
| 2012/0158541 A1* | 6/2012 | Ganti | .................. | H04L 63/1425 705/26.35 |
| 2013/0159217 A1* | 6/2013 | Davis | ................. | G06Q 30/0609 705/400 |
| 2015/0317475 A1 | 11/2015 | Aguayo | | |
| 2015/0324802 A1 | 11/2015 | Kolkowitz et al. | | |
| 2018/0048550 A1 | 2/2018 | Beyah | | |

FOREIGN PATENT DOCUMENTS

WO 2017083436 A1 5/2017

* cited by examiner

*Primary Examiner* — Tu T Nguyen
(74) *Attorney, Agent, or Firm* — Arent Fox LLP; Michael Fainberg

(57) ABSTRACT

The present disclosure provides systems and methods of selecting candidates for comparison of fingerprints of devices. An exemplary method comprises calculating a digital fingerprint of a device, determining a group of digital fingerprints where the digital fingerprint occurs, calculating vectors of changed features of each digital fingerprint, calculating a probability that the digital fingerprint and each digital fingerprint within the group belong to the same chain, identifying a set of candidates from the group whose probability of belonging to the same chain of fingerprints crosses a value, comparing the calculated digital fingerprint of the device with the fingerprints in the set of candidates, determine that the device correspond to a device in the set of candidates when the comparison results in a match higher than a specified threshold and permitting the user actions, otherwise tracking the user actions with the online service as fraudulent activity.

20 Claims, 3 Drawing Sheets

SYSTEM AND METHOD OF IDENTIFYING FRAUDULENT ACTIVITY FROM A USER DEVICE USING A CHAIN OF DEVICE FINGERPRINTS

CROSS REFERENCE TO RELATED APPLICATIONS

This application claims benefit of priority under 35 U.S.C. 119(a)-(d) to Russian Patent Application No. 2018147222 filed Dec. 28, 2018, which is incorporated by reference herein in its entirety.

FIELD OF TECHNOLOGY

The present disclosure relates to solutions for ensuring a secure interaction of a user with online services, more specifically to systems and methods of identifying fraudulent activity from a user device using a chain of device fingerprints.

BACKGROUND

The sphere of banking services has significantly expanded in recent years. Bank customers are being offered new ways of interacting with the bank and methods of payment and transfer of funds as users of their IT infrastructure. The multitude of payment systems, credit cards and banking services (the bank services are often called remote banking services) lets the user carry out a variety of transactions using computing devices. Online banking and mobile banking are making it possible to carry out financial operations with the use of credit card or bank account information.

Various mechanisms exist for protecting the funds of the user against being accessed by third parties. When the user is working with online banking, a method such as double authentication is often used. After entering authentication data on the bank site with the use of a browser or in the bank's application on a mobile device (such as a login and password, which may become accessible to third parties), the bank sends a message to the user on his or her mobile telephone, containing for example a supplemental verification code, which needs to be entered in a special field.

However, it should be mentioned that there are many attacks exploiting vulnerabilities in the interaction of the user with banking services, which are carried out by criminals with the goal of obtaining access to the user's funds. Often such attacks are known as fraudulent activity. Thus, for example, the login and password for access to online banking may be obtained with the aid of phishing sites. Malicious software for mobile devices lets the criminals gain access to the supplemental verification codes and carry out transactions with confirmation, unbeknownst to the user.

Systems and methods are known which employ a so-called "fingerprint" of the user's device in order to protect the user against fraud activity. A user generally makes use of the same devices, each device containing a particular suite of software and features (hardware and software data) which are known to the bank. If the software suite is altered on the device, or if the device itself is changed, there is a high probability that fraudulent activity is taking place. When fraudulent activity is carried out on a device, that device is deemed to be dangerous by the remote bank services.

However, collisions of device fingerprints may occur. Oftentimes the devices do not provide access to identify their serial numbers or IMEI, and therefore two devices may have the same fingerprints, or fingerprints resembling each other to a degree greater than a threshold value.

Moreover, the matching of a fingerprint may indicate that the device of a legitimate user may be being used by another user, or an attempt is being made to emulate (duplicate) the user's device.

It should also be mentioned that it is not possible to compare the fingerprint of a device from which a user is interacting with an online service to all known fingerprints in a short period of time, due to the significant number of known fingerprints (millions of them).

Therefore, as one optimization possibility, it is necessary to also solve the problem of identifying similar fingerprints (candidates) among all known fingerprints. The present disclosure effectively solves the problem of selecting candidates for comparing of fingerprints of devices when a user is interacting with online services.

SUMMARY

The present disclosure describes methods identifying fraudulent activity from a user device using a chain of device fingerprints from the multitude of all known fingerprints of devices.

The technical result of the present disclosure is to realize the stated purpose.

According to one variant aspect, an exemplary method comprises calculating a digital fingerprint of one or more devices belonging to a user accessing an online service, determining a group of digital fingerprints where the digital fingerprint occurs, calculating a plurality of vectors of features for changed features of each digital fingerprint within the determined group, calculating a probability that the digital fingerprint and each digital fingerprint within the determined group belong to a same chain of fingerprints, identifying a set of candidates from the digital fingerprints of the group whose probability of belonging to the same chain of fingerprints crosses a threshold value, comparing the calculated digital fingerprint of the one or more devices with the fingerprints of devices in the set of candidates, determining whether the one or more devices correspond to one of the devices identified in the set of candidates when the comparison results in a match higher than a specified threshold and in response to determining that the one or more devices correspond to one of the devices in the set of candidates, permitting the user actions, otherwise tracking the user interactions with the online service as fraudulent activity.

According to another variant aspect, a method is presented in which fingerprints are broken down into groups according to features such that the measure of similarity between any given pair of fingerprints from different groups is equal to zero.

According to one particular variant aspect, a method is presented in which a matrix of joint pairwise probabilities of features is calculated.

According to one particular variant aspect, a method is presented in which the columns and rows corresponding to a vector of altered features are identified from the mentioned matrix of joint pairwise probabilities.

According to one particular variant aspect, a method is presented in which the minimal element in the calculated matrix is identified.

According to one particular variant aspect, wherein common features of a group comprise operating system family and browser family.

According to one particular variant aspect, the method further comprises calculating a probability of change in features during a chain of values of the digital fingerprint of the device ordered in time.

According to one variant aspect, another exemplary method comprises: the digital fingerprint of the user's device is calculated with the aid of a collection module, wherein the digital fingerprint contains at least one characteristic of that device, collected at the moment of time when the interaction of the user with the remote services is occurring using that device; with the aid of an analysis module, a group of fingerprints is determined, in which the mentioned fingerprint occurs; with the aid of the analysis module, the vectors are calculated for features which have changed in that fingerprint and all the fingerprints of the group; the analysis module is used to calculate the probability of that fingerprint and each fingerprint of the group belonging to the same chain; the analysis module is used to identify fingerprints of the group whose probability of belonging to the same chain as the mentioned fingerprint is above a threshold value.

According to another aspect, a system of the present disclosure includes: a hardware processor configured to: calculate a digital fingerprint of one or more devices belonging to a user accessing an online service, determine a group of digital fingerprints where the digital fingerprint occurs, calculate a plurality of vectors of features for changed features of each digital fingerprint within the determined group, calculate a probability that the digital fingerprint and each digital fingerprint within the determined group belong to a same chain of fingerprints, identify a set of candidates from the digital fingerprints of the group whose probability of belonging to the same chain of fingerprints crosses a threshold value, compare the calculated digital fingerprint of the one or more devices with the fingerprints of devices in the set of candidates, determine whether the one or more devices correspond to one of the devices identified in the set of candidates when the comparison results in a match higher than a specified threshold and in response to determining that the one or more devices correspond to one of the devices in the set of candidates, permit the user interactions, otherwise tracking the user interactions with the online service as fraudulent activity.

In another exemplary aspect, a non-transitory computer-readable medium is also provided with instructions stored thereon to execute the method and system described above, and herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product of selecting candidates for comparison of fingerprints of devices. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The system of the present disclosure includes actual devices, systems, components, groups of components, realized with the use of hardware such as integrated microcircuits (application-specific integrated circuit, ASIC) or field-programmable gate arrays (FPGA) or, for example, in the form of a combination of software and hardware such as a microprocessor system and a set of program instructions, and also based on neurosynaptic chips. The functionality of the indicated components of the system may be realized exclusively by hardware, and also in the form of a combination, where some of the functionality of the components of the system is realized by software and some by hardware. In certain variant aspects, some of the components or all of the components can be implemented on the processor of a general-purpose computer (such as the one depicted in FIG. 3). Each of the components of the system may be realized within a single computing device or spread apart among several interconnected computing devices.

Figure 1:
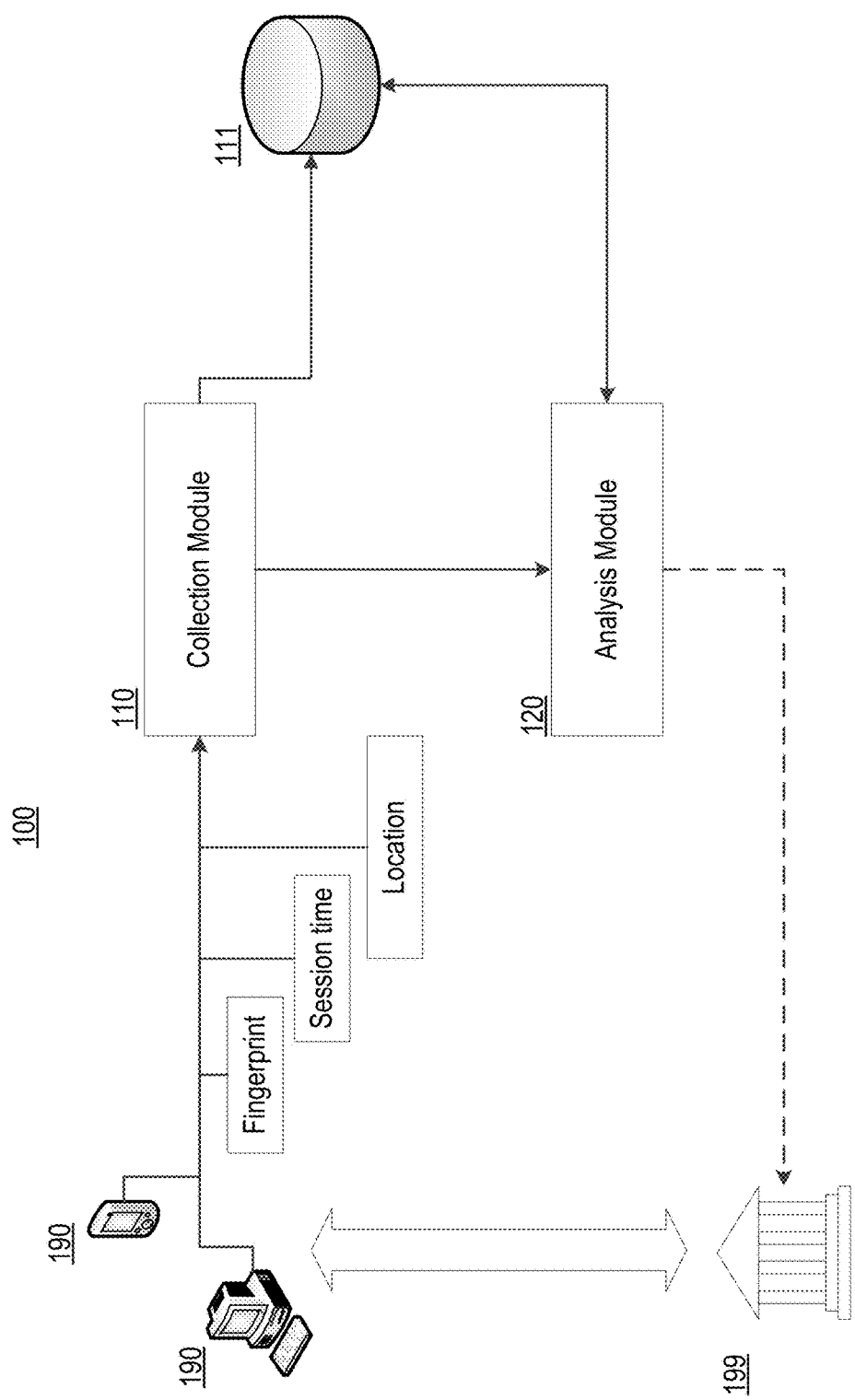
FIG. 1 is a block diagram of the system for selecting candidates to compare the fingerprints of the devices of a user, according to exemplary aspects of the disclosure.

FIG. 1 is a block diagram of the system 100 for selecting candidates to compare the fingerprints of the devices 190 of a user, according to exemplary aspects of the disclosure. The system 100 comprises a collection module 110 and an analysis module 120. In exemplary aspects, the devices 190 are used by a user to interact with remote services. The system 100 is configured to resolve collisions of digital fingerprints (hereinafter, the term fingerprint is used) of devices 190 when a user is interacting with remote services. The remote services are network or online services which are running (functioning) on a remote server (or on a distributed system of servers) or as a cloud service, with which the user interacts using an account. Examples of such services are banking services, email, social networks, and others (hereafter in the text, online services 199).

The device 190 in the context of the present disclosure includes a program execution environment running on a computing device. In exemplary aspects, the program execution environment may be a browser running on a computer, a bank application running on a mobile device, or the like.

The present disclosure solves the problem of searching for similar fingerprints of devices 190 from the multitude of all known fingerprints of devices 190 to the fingerprint of the device 190 by which the user is interacting with the online service 199.

To solve the problem, the probability of a pair of fingerprints belonging to a chain of fingerprints of the same device 190 is used as a measure of similarity. The chain of fingerprints of a device 190 refers to, in one aspect, a sequence of values, ordered in time, of fingerprints corresponding to the device 190. In other words, the chain of fingerprints is a chain of evolution of a fingerprint for a given device 190.

In one variant aspect, the collection module 110 is configured to gather fingerprints of devices 190. In the general case, a fingerprint contains the characteristics of the device 190. The characteristics of the device 190 include at least:
- the identifier of the operating system under whose control the device 190 is working;
- regional characteristics of the firmware of the device 190 (such as the continent/country/city);
- the account identifier (such as the Microsoft, Google or Apple account identifier);
- data as to whether the device 190 (the program execution environment) is operating within a virtual machine or an emulator (whether the device is being emulated);
- the presence of root access on the device 190;
- the version of the browser installed on the device 190 (the browser of the device 190);
- the plug-ins installed in the browser of the device 190;
- vulnerable applications installed on the device 190 (known vulnerabilities of the applications); and/or
- other attributes of the device 190.

In one variant aspect, the digital fingerprints are gathered by executing a script (such as a JavaScript) in the browser of the device 190. The script may be stored on the remote server and transmitted to the device 190 when the device 190 accesses the online service 199. Thus, the collection module 110 is stored on the server (e.g., a bank server), and the collection module 110 is executed on the device 190 of the user.

In yet another variant aspect, the digital fingerprints are gathered by security applications (such as antivirus applications). In this case, the collection module 110 is a module of the security application.

In yet another variant aspect, the gathering of the mentioned digital fingerprints is done by means of an application running on the device 190, where the application may be designed to access online services 199 and is created with the use of a software development kit (SDK), provided for example by the antivirus application developer (such as KASPERSKY and the Mobile Security SDK). In this case, the collection module 110 is a module of that application.

In one variant aspect, the collection module 110 gathers the fingerprints of devices 190 at the moments of time when the interaction of the user with the services 199 using said device 190 is taking place. Thus, the collection module 110 also collects information during periods of user interactions on device 109 with the services 199 during active sessions. In another variant aspect, the collection module 110 gathers said fingerprints of devices 190 at definite moments of time (for example, by a schedule, once a day on weekends, twice a day on work days). In yet another variant aspect, the collection module 110 gathers the mentioned fingerprints of devices 190 at definite intervals of time (such as every 6 hours).

In a preferred variant aspect, the collection module 110 gathers the locations of the sessions of the user's interaction with the online services 199 using the devices 190.

The data gathered by the collection module 110 about the device 190 is sent to the analysis module 120. In one variant aspect, said digital fingerprints gathered by the collection module 110 about the device 190 are kept by the collection module 110 in a database 111.

The analysis module 120 is executed (functions) on a remote server (or on a distributed system of servers) or as a cloud service.

The analysis module 120, in some aspects, identifies fingerprints of devices 190 that are similar to the given one using a similarity measure. The given fingerprint is the fingerprint of the device being used for the session with the online service 199. Upon identifying similar fingerprints of the devices 190, the analysis module 120 calculates the probability of the fingerprint belonging to the same device 190 as the given one. The probability that the fingerprint belongs to device 190 is compared to a threshold, and if the threshold is crossed/exceeded, the analysis module 120 concludes that the fingerprints are of the same device 190.

Using the above-described measure of similarity, (the probability of a pair of fingerprints belonging to the chain of fingerprints of the same device 190), the threshold for the selection of candidates consists in the following: the threshold is the minimal probability that the fingerprints selected by the analysis module 120 may exist in the same chain as the given fingerprint, that is, the fingerprint belongs to the same device 190.

Thus, for a given fingerprint it is necessary to find similar fingerprints and arrange them in order of similarity. When calculating the measure of similarity, the problem arises of comparing the initial fingerprint to each of the fingerprints known at the given moment of time. The complexity of the algorithm for selection of candidates is proportional to the cardinality of the set of fingerprints (the cardinality of a set is a characteristic of incalculable/infinite sets known in the prior art). On the basis of statistical data from the working of the present disclosure, the set of fingerprints is numbered in a substantial amount (around 15 million fingerprints of devices 190).

In order to limit the set of fingerprints considered, the analysis module 120 breaks up the fingerprints of devices 190 into groups by features. In exemplary aspects, the measure of similarity between any given pair of fingerprints from different groups will be equal to zero. Thus, the selection of fingerprints is limited to the group in which the initial fingerprint occurs.

Generally, the device 190 cannot exist under the control of different types of OS and with different types of browsers at the same time, so that the analysis module 120 assigns the OS family and the browser family to the features of the groups.

Furthermore, it is not useful to compare a pair of fingerprints when a whole series of features is absent from one of the features being compared. Thus, for example, if a cross platform API for 3D graphics in a browser (WebGL) is not being used on the device 190, the fingerprint for the device 190 will lack the set of features related to that API. In another example, the features related to that API may have zero value, but it is not expedient to use them in the calculations. Therefore, in a particular variant aspect, the analysis module 120 will add additional data to the features of the groups of fingerprints, such as a flag for use of WebGL.

Based on the above, in order to calculate the probability of a pair of fingerprints belonging to the same chain of fingerprints of the same device 190, the analysis module 120 must:

identify the group of features which have changed, calculate the joint probability of the group of changed features.

The fingerprint consists of a sizeable number of features (the practical implementation of the present disclosure uses more than 260 features)—binary features, category features, and sets (scripts, plug-ins, etc.). For each feature, the analysis module 120 can calculate the probability of its change during the evolution of the fingerprint of the device 190. By the evolution of the fingerprint of the device is meant a chain of specific values of the fingerprint of the device 190 that is ordered in time. From the chain of fingerprints, possible pairs of fingerprints are extracted and used to calculate the probability.

In order to calculate the exact value of the joint probability, it is necessary to estimate the total joint probability of all changed features and furthermore take into account the probabilities of the change in specific values within each feature, that is, for example, to take into account the probability of a change in the specific screen resolution to a different specific value. The joint probability is the probability that the random events being considered (in the present disclosure, an event is the change in a specific feature of a fingerprint) will occur at the same time. For example, the probability that the browser version has changed and a new font has appeared at the same time. Such an approach significantly complicates the realization of the present disclosure and increases the complexity. Therefore, the analysis module 120 estimates the probabilities of change of the features without considering their specific values, that is, it considers the mere fact of the change.

For an exact calculation of the joint probability, it is necessary to calculate the joint probabilities for all possible groups of features, which is computationally impossible given the substantial number of features (as noted above, the practical implementation of the present disclosure uses more than 260 features).

Since the number of different observable groups of features in the practical implementation of the present disclosure is on the order of several hundreds of thousands, which is substantially less than the theoretically possible number, in the general aspect the analysis module 120 assesses the probability of a change in a specific group of features by the frequency of its occurrence in the data on the fingerprints as gathered by the collection module 110.

The analysis module 120 assesses the upper limit of the joint probability of a change in the group of features by the minimal joint probability of a pair of features from all possible pairs formed on the basis of the group. For example, 3 features of the fingerprint have changed: A, B and C. Having calculated the joint probabilities P(A,B), P(A,C), P(B,C), the analysis module 120 selects, as the upper limit, the minimal joint probability given that P(A,B,C)<=min(P(A,B), P(A,C), P(B, C).

Based on this approach to the assessing of the probability, the analysis module 120 first calculates, for each group of fingerprints, the matrix of joint pairwise probabilities of the features (for example, a matrix of dimensions 260*260). When evaluating a pair of fingerprints, knowing the vector of changed features, the analysis module 120 selects the rows and columns, from the full matrix, corresponding to the vector of changed features, and identifies the minimal element in the resulting matrix.

It should be noted that we shall use in the remainder of the text constructions of the kind:

$$X=\{x|<\text{condition}>\}.$$

These constructions are known as "set-builder notation" and in the general case they mean that a set "X" is specified, which includes all elements "x" for which the "condition" is fulfilled.

The initial data are:

$fp_{query}=(v_0, v_1, \ldots)$—the initial fingerprint of the device 190 in the form of a vector of features, for which similar fingerprints of devices 190 are determined;

i) F—the set of all fingerprints of the group of devices 190 to which the initial fingerprint of the device 190 belongs;

ii) $N=|fp_{query}|$—the dimensionality of the vector of features of the fingerprint of the device 190;

iii) M—the matrix of pairwise joint probabilities for fingerprints of the group of devices 190 to which the initial fingerprint of the device 190 belongs;

$$M = \begin{bmatrix} m_{00} & \cdots & m_{0N} \\ \vdots & \ddots & \vdots \\ m_{N0} & \cdots & m_{NN} \end{bmatrix} \quad \text{iv)}$$

$proba_{min}$—the minimal value of the probability in order to include the fingerprint of the device 190 among the candidates;

The analysis module 120 calculates the difference vector of two fingerprints of devices 190:

$$fp\_diff(fp1,fp2)=\{i|i\in[0,N] \& fp1[i]\neq fp2[i]\}$$

Using the vector so calculated, the analysis module 120 calculates the probability of fingerprints of devices 190 belonging to an adjacent pair:

$$\text{neighbour\_proba}(fp1,fp2)=\min(\{Mij|i,j\in fp\_diff(fp1, fp2)\})$$

Based on the probability so calculated, the analysis module 120 makes a selection of candidates:

$$fp\_candidates(fpquery,proba_{min})=\{fp|fp\in F \& \text{neighbour\_proba}(fpquery,fp)\geq proba_{min}\}$$

The obtained results are used by systems and methods known in the prior art for a more accurate comparison of the fingerprints of devices 190. It is important to understand here that in the comparison the fingerprint of the device 190 is compared not with all known fingerprints, but only with candidates selected as a result of the working of the present disclosure, which significantly increases the performance of the systems of the online service 199 and allows the online services 199 to be provided to the user in real time or with a minimal delay.

In the general case, the results are dispatched by the analysis module 120 to the security systems of the online services 199 for further analysis and decision making as to the current action of the user with the use of the device 190, as identified by the collection module 110 (for example, whether the action from the device 190 is fraudulent), and tracking of the user's action (for example, in order to block the transaction if fraud activity is identified).

Figure 2:
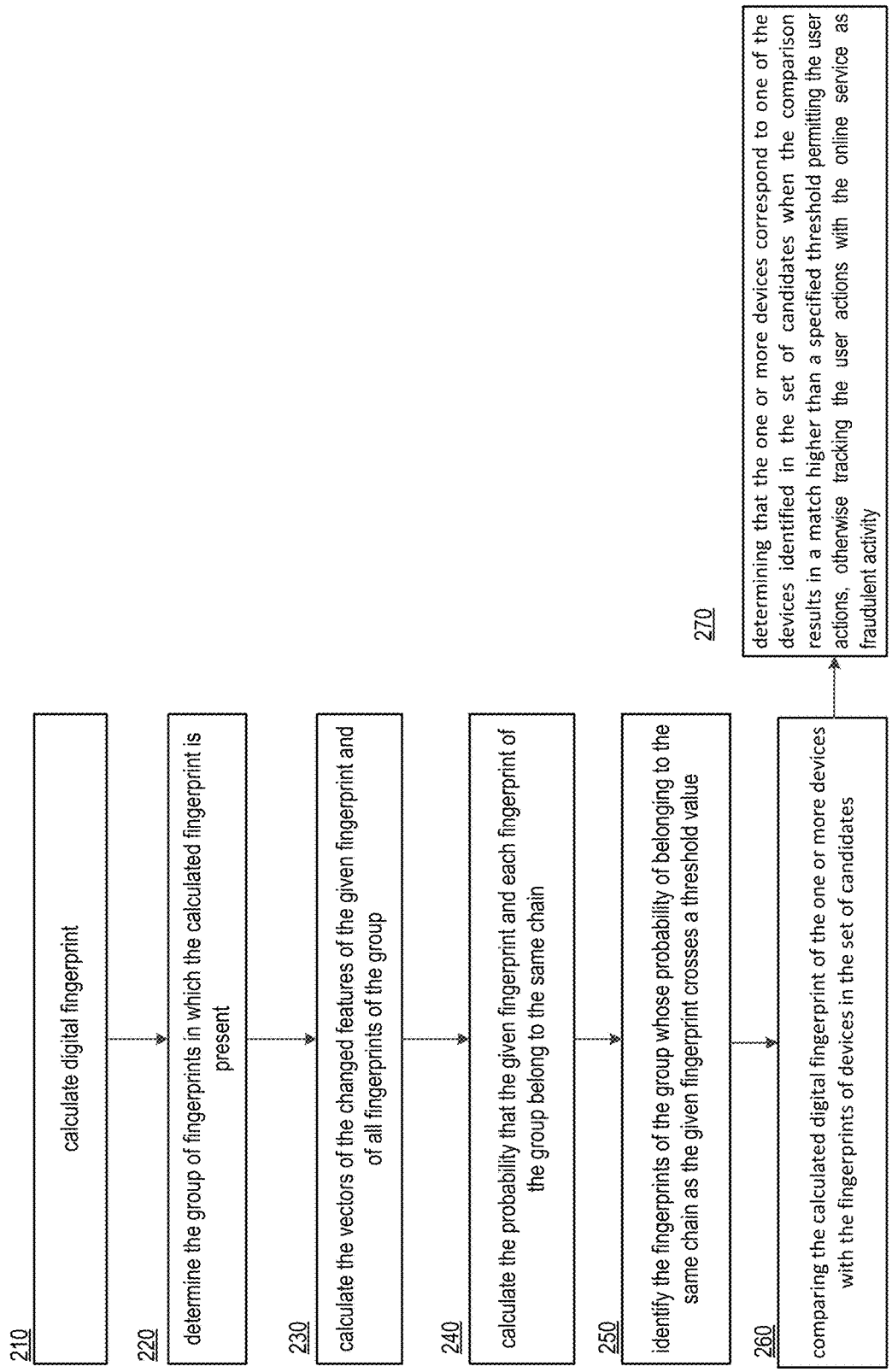
FIG. 2 illustrates a flow diagram of the method for selecting candidates to compare the fingerprints of the devices of a user, according to exemplary aspects of the disclosure.

FIG. 2 illustrates a flow diagram of the method for selecting candidates for comparing the fingerprints of the devices of a user, according to exemplary aspects of the disclosure.

In step 210, the digital fingerprint of a device 190 is collected using the collection module 110. In exemplary aspects, the digital fingerprint contains at least one characteristic of the device 190, collected at the moment of time of the interaction of the user with online services 199 using the device 190.

In step 220, with the aid of an analysis module 120, a group of fingerprints is determined, in which the mentioned fingerprint occurs. In one variant aspect, the fingerprints are broken down by the analysis module 120 into groups according to features such that the measure of similarity between any given pair of fingerprints from different groups is equal to zero. The measure of similarity is the probability of a pair of fingerprints belonging to the chain of fingerprints of the same device 190.

In step 230, the analysis module 120 calculates vectors for features which have changed in that fingerprint and all the fingerprints of the group. In one variant aspect, the analysis module 120 calculates a matrix of joint pairwise probabilities of features to determine which features have changed. Subsequently, the analysis module 120 identifies the columns and rows corresponding to a vector of altered features from the mentioned matrix of joint probabilities.

In step 240, the analysis module 120 is used to calculate the probability of that fingerprint and each fingerprint of the group belonging to the same chain. In one variant aspect, the analysis module 120 identifies the minimal element in the calculated matrix of joint probabilities of the features.

In step 250, the analysis module 120 is used to identify the fingerprints of devices in the group whose probability of belonging to the same chain as the mentioned fingerprint is above a threshold value.

In step 260, the analysis module 120 compares the calculated digital fingerprint of the one or more devices with the fingerprints of devices in the set of candidates.

In step 270, the analysis module 120 determines that the one or more devices correspond to one of the devices identified in the set of candidates when the comparison results in a match of specified criteria higher than a specified threshold. The analysis module 120 then permits the user actions, otherwise if the comparison does not result in a match higher than a specified threshold, the analysis module 120 tracks the user actions with the online service as fraudulent activity.

Figure 3:
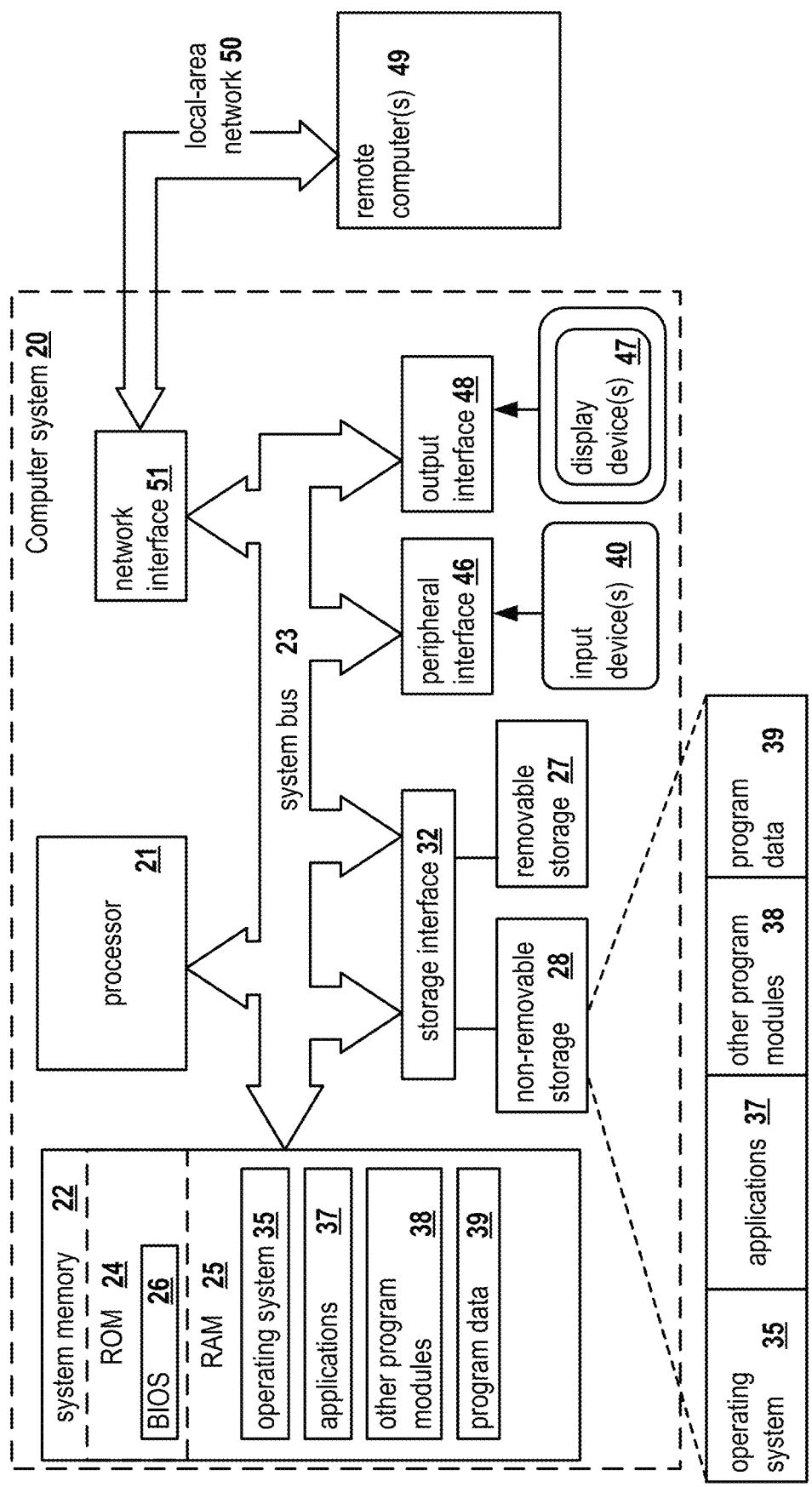
FIG. 3 presents an example of a general-purpose computer system on which the present disclosure can be realized, according to exemplary aspects of the disclosure.

FIG. 3 is a block diagram illustrating a computer system 20 on which aspects of systems and methods of selecting candidates for comparison of fingerprints of devices may be implemented in accordance with an exemplary aspect. It should be noted that the computer system 20 can correspond to any components of the system 100 described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure.

The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computer system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method of identifying fraudulent activity from a user device using a chain of device fingerprints, the method comprising:

calculating a digital fingerprint of one or more devices belonging to a user accessing an online service;

determining a group of digital fingerprints where the digital fingerprint occurs;

calculating a plurality of vectors of features for changed features of each digital fingerprint within the determined group;

calculating a probability that the digital fingerprint and each digital fingerprint within the determined group belong to a same chain of fingerprints;

identifying a set of candidates from the digital fingerprints of the group whose probability of belonging to the same chain of fingerprints crosses a threshold value;

comparing the calculated digital fingerprint of the one or more devices with the fingerprints of devices in the set of candidates;

determining whether the one or more devices correspond to one of the devices identified in the set of candidates when the comparison results in a match higher than a specified threshold; and in response to determining that the one or more devices correspond to one of the devices in the set of candidates, permitting user interactions with the online service, otherwise tracking the user interactions with the online service as fraudulent activity.

2. The method of claim 1, further comprising:
calculating the digital fingerprint when the user is interacting with a remote service using the one or more devices.

3. The method of claim 1, further comprising:
determining the group of the digital fingerprint based on features of the digital fingerprint,
wherein a measure of similarity between the digital fingerprint and any pair of fingerprints from a different group is equal to zero.

4. The method of claim 1, further comprising:
calculating a matrix of joint pairwise probabilities of changed features of the digital fingerprint.

5. The method of claim 4, further comprising:
identifying columns and rows corresponding to a vector of altered features from the matrix of joint pairwise probabilities.

6. The method of claim 5, further comprising:
identifying the minimal element in the calculated matrix.

7. The method of claim 1, wherein common features of a group comprise operating system family and browser family.

8. The method of claim 1, further comprising:
calculating a probability of change in features during a chain of values of the digital fingerprint of the one or more devices ordered in time.

9. A system of identifying fraudulent activity from a user device using a chain of device fingerprints, the system comprising:
a hardware processor configured to:
calculate a digital fingerprint of one or more devices belonging to a user accessing an online service;
determine a group of digital fingerprints where the digital fingerprint occurs;
calculate a plurality of vectors of features for changed features of each digital fingerprint within the determined group;
calculate a probability that the digital fingerprint and each digital fingerprint within the determined group belong to a same chain of fingerprints;
identify a set of candidates from the digital fingerprints of the group whose probability of belonging to the same chain of fingerprints crosses a threshold value;
compare the calculated digital fingerprint of the one or more devices with the fingerprints of devices in the set of candidates;
determine whether the one or more devices correspond to one of the devices identified in the set of candidates when the comparison results in a match higher than a specified threshold; and
in response to determining that the one or more devices correspond to one of the devices in the set of candidates, permit user interactions with the online service, otherwise tracking the user actions with the online service as fraudulent activity.

10. The system of claim 9, wherein the hardware processor is further configured to:
calculate the digital fingerprint when the user is interacting with a remote service using the one or more devices.

11. The system of claim 9, wherein the hardware processor is further configured to:
determine the group of the digital fingerprint based on features of the digital fingerprint,
wherein a measure of similarity between the digital fingerprint and any pair of fingerprints from a different group is equal to zero.

12. The system of claim 9, wherein the hardware processor is further configured to:
calculate a matrix of joint pairwise probabilities of changed features of the digital fingerprint.

13. The system of claim 12, wherein the hardware processor is further configured to:
identify columns and rows corresponding to a vector of altered features from the matrix of joint pairwise probabilities.

14. The system of claim 13, wherein the hardware processor is further configured to:
identify the minimal element in the calculated matrix.

15. The system of claim 9, wherein common features of a group comprise operating system family and browser family.

16. The system of claim 9, wherein the hardware processor is further configured to:
calculate a probability of change in features during a chain of values of the digital fingerprint of the one or more devices ordered in time.

17. A non-transitory computer-readable medium, storing computer executable instructions thereon of identifying fraudulent activity from a user device using a chain of device fingerprints, the instructions comprising:
calculating a digital fingerprint of one or more devices belonging to a user accessing an online service;
determining a group of digital fingerprints where the digital fingerprint occurs;
calculating a plurality of vectors of features for changed features of each digital fingerprint within the determined group;
calculating a probability that the digital fingerprint and each digital fingerprint within the determined group belong to a same chain of fingerprints;
identifying a set of candidates from the digital fingerprints of the group whose probability of belonging to the same chain of fingerprints crosses a threshold value;
comparing the calculated digital fingerprint of the one or more devices with the fingerprints of devices in the set of candidates;
determining whether the one or more devices correspond to one of the devices identified in the set of candidates when the comparison results in a match higher than a specified threshold; and
in response to determining that the one or more devices correspond to one of the devices in the set of candidates, permitting user interactions with the online service, otherwise tracking the user actions with the online service as fraudulent activity.

18. The medium of claim 17, further comprising:
calculating the digital fingerprint when the user is interacting with a remote service using the one or more devices.

19. The medium of claim 17, further comprising:
determining the group of the digital fingerprint based on features of the digital fingerprint,
wherein a measure of similarity between the digital fingerprint and any pair of fingerprints from a different group is equal to zero.
20. The medium of claim 17, further comprising:
calculating a matrix of joint pairwise probabilities of changed features of the digital fingerprint.

\* \* \* \* \*